US012734596B2

(12) United States Patent
Miyamoto et al.

(10) Patent No.: US 12,734,596 B2
(45) Date of Patent: Sep. 15, 2026

(54) POWER CUTTING MACHINE

(71) Applicant: YAMABIKO CORPORATION, Tokyo (JP)

(72) Inventors: Tadafumi Miyamoto, Tokyo (JP); Kazuhiro Umetani, Tokyo (JP)

(73) Assignee: YAMABIKO CORPORATION, Tokyo (JP)

(*) Notice: Subject to any disclaimer, the term of this patent is extended or adjusted under 35 U.S.C. 154(b) by 102 days.

(21) Appl. No.: 18/656,753

(22) Filed: May 7, 2024

(65) Prior Publication Data

US 2024/0375196 A1 Nov. 14, 2024

(51) Int. Cl.
*B23D 47/04* (2006.01)
*B23D 47/12* (2006.01)

(52) U.S. Cl.
CPC ........... *B23D 47/042* (2013.01); *B23D 47/12* (2013.01)

(58) Field of Classification Search
CPC .......... B23D 47/12; B23D 47/42; B26D 7/22; B26D 7/24; B27G 19/003; B27G 19/00; B27G 17/02
See application file for complete search history.

(56) References Cited

U.S. PATENT DOCUMENTS 1,450,906 A * 4/1923 Anderson ................ B27B 5/38 474/133
3,581,481 A * 6/1971 Hanson ............. A01D 34/6812 474/135
4,117,752 A * 10/1978 Yoneda .................... F16P 3/12 83/62.1
4,432,139 A * 2/1984 Kohler ................. B27B 17/083 30/381
4,528,488 A * 7/1985 Susemihl ........... B23Q 11/0092 83/DIG. 1
4,662,072 A * 5/1987 Wieland ............... B27B 17/083 188/77 R
4,920,649 A * 5/1990 Strom ....................... F16P 3/00 318/116

(Continued)

FOREIGN PATENT DOCUMENTS

DE 3639650 A1 * 6/1988 ............ F16D 49/08
DE 2014007878 A1 11/2015

(Continued)

OTHER PUBLICATIONS

Extended European Search Report cited in corresponding European Patent Appln. No. 24174580.1 dated Aug. 29, 2024.

*Primary Examiner* — Boyer D Ashley
*Assistant Examiner* — Fernando A Ayala
(74) *Attorney, Agent, or Firm* — BACON & THOMAS, PLLC

(57) ABSTRACT

A power cutting machine includes a main body including a motor, an arm connected to the main body at its base end and including a belt transmission mechanism configured to transmit drive power of the motor, and a working device connected to the head end of the arm and including a cutting blade configured to be rotated by power transmitted via the belt transmission mechanism. The arm includes a brake mechanism configured to apply a brake to a drive pulley of the belt transmission mechanism. The brake mechanism includes an indicator mechanism configured to allow a braking state to be visually recognized.

11 Claims, 3 Drawing Sheets

(56) References Cited

U.S. PATENT DOCUMENTS

| | | | | |
|---|---|---|---|---|
| 10,816,048 | B2 | 10/2020 | Schneider et al. | |
| 2006/0201301 | A1* | 9/2006 | Schwaiger | B23D 45/068 83/477.1 |
| 2010/0140025 | A1* | 6/2010 | Aronsson | F16D 49/18 188/68 |
| 2012/0036725 | A1* | 2/2012 | Osborne | B27B 17/083 83/62.1 |
| 2014/0260846 | A1* | 9/2014 | Voong | B23D 47/00 83/13 |
| 2015/0260241 | A1 | 9/2015 | Steingruber | |
| 2015/0273725 | A1* | 10/2015 | Gass | B27G 19/008 83/58 |
| 2017/0066068 | A1* | 3/2017 | Hanussek | F16H 55/36 |
| 2020/0246957 | A1* | 8/2020 | Hanussek | B23D 45/16 |

FOREIGN PATENT DOCUMENTS

| | | | |
|---|---|---|---|
| DE | 102017005558 | A1 | 12/2018 |
| EP | 3412392 | B1 | 9/2021 |
| JP | 2011-251348 | A | 12/2011 |

* cited by examiner

POWER CUTTING MACHINE

CROSS-REFERENCE TO RELATED APPLICATIONS

The present application claims priority from Japanese Patent Application No. 2023-077174 filed on May 9, 2023, and the entire contents of which are hereby incorporated by reference.

BACKGROUND

1. Technical Field

The present invention relates to a power cutting machine.

2. Related Art

A power cutting machine is a working machine configured to cut objects with a cutting blade by transmitting power of a motor such as an engine and an electric motor to the cutting blade. Examples of the power cutting machine include a concrete cutter to cut concrete and asphalt and a chain saw to cut wood and trees.

A conventional power cutting machine includes a main body including a motor such as an engine, an arm including a belt transmission mechanism configured to transmit power of the motor to the head end of the arm, and a working device including a cutting blade configured to be driven by power transmitted to the head end of the arm. A handheld power cutting machine generally includes a rear handle provided on the rear side of the main body and a front handle provided on the head side of the main body.

Depending on a type of power cutting machine, such as a concrete cutter, uses a cutting blade having a large inertial force for a hard object to cut. This sort of power cutting machine is known to include a brake controller provided in the main body to stop the rotation of the cutting blade immediately after the motor stops. See Japanese Patent Application Laid-Open No. 2011-251348). The entire contents of this disclosure are hereby incorporated by reference.

SUMMARY

The present invention provides a power cutting machine including a main body including a motor, an arm connected to the main body at its base end and including a belt transmission mechanism configured to transmit drive power of the motor, and a working device connected to the head end of the arm and including a cutting blade configured to be rotated by power transmitted via the belt transmission mechanism. The arm includes a brake mechanism configured to apply a brake to a drive pulley of the belt transmission mechanism. The brake mechanism includes an indicator mechanism configured to allow a braking state to be visually recognized.

DETAILED DESCRIPTION

Figure 1:
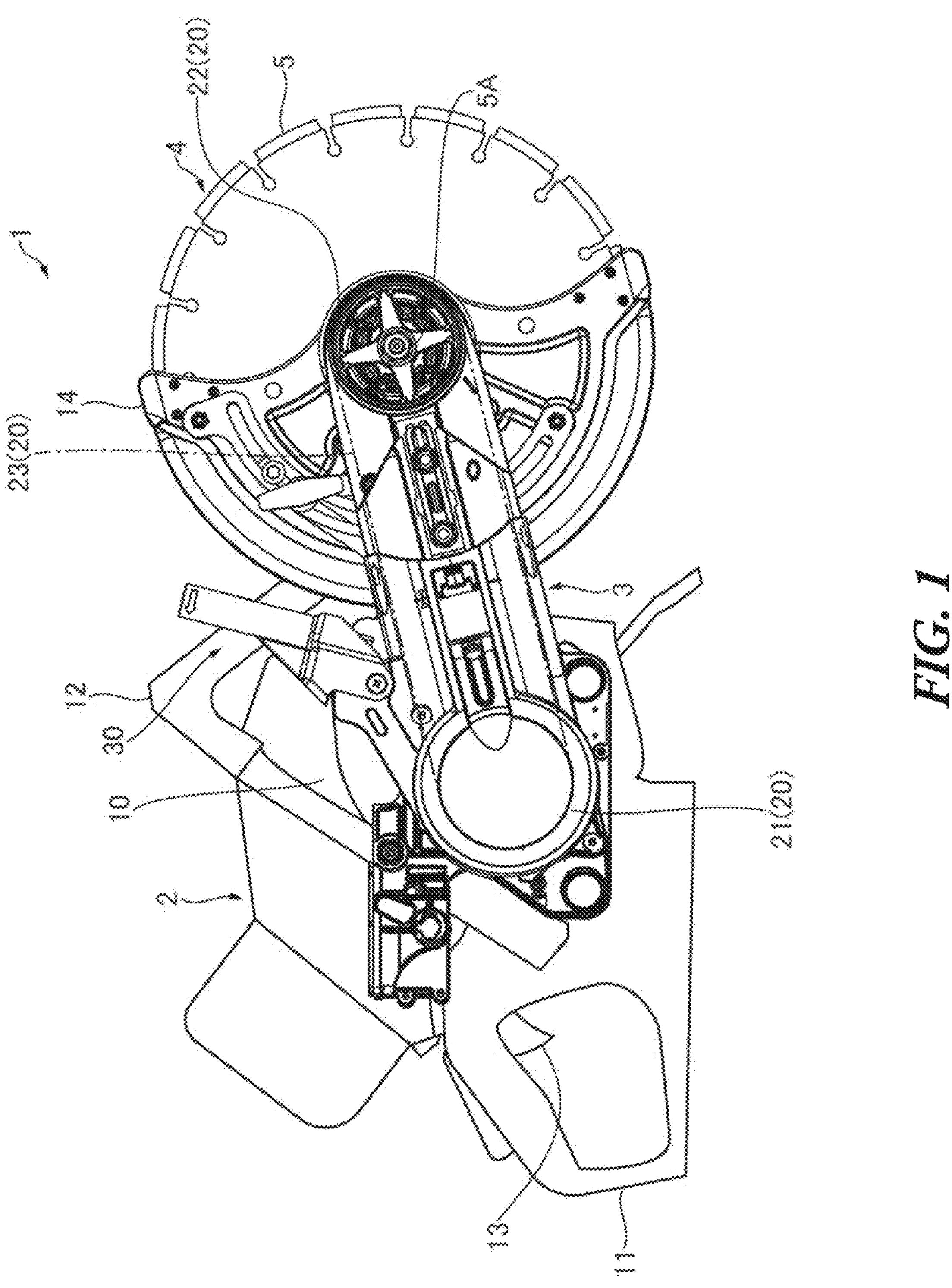
FIG. 1 is an illustration of a power cutting machine according to an embodiment of the invention.

When the cutting blade of the above described power cutting machine is subject to a large load, for example, the cutting blade is caught in a cut during cutting work, the reaction force of the load acts on the cutting blade. Then, the working device provided on the head end of the power cutting machine may be recoiled from the object, which is a phenomenon called as "kickback." Especially in the case of a handheld power cutting machine, a kickback causes the working device (the cutting blade) to approach the worker holding the handle. Therefore, it is necessary to take measures to prevent the kickback for safety work.

However, the brake mechanism in the above-described prior art is provided in a clutch drum of a centrifugal clutch. The centrifugal clutch is directly connected to the driving shaft of the engine; therefore, the brake mechanism cannot be applied to electric products not requiring clutch drums and products even with clutch drums depending on their positions. In addition, the brake mechanism is actuated to stop the rotation of the cutting blade by detecting a throttle lever not operating after the engine stops; therefore, the brake mechanism is ineffective against the kickback which suddenly occurs during cutting work, that is, during the operation of the motor.

In addition, the worker may not notice that the brake controller operates with the conventional power cutting machine. In this case, the worker continues to operate the actuating lever of the motor while the brake controller operates and has problems with the power cutting machine, for example, the clutch mechanism is burnt out.

The present invention is proposed to address these problems. Therefore, the objects of the invention are to make it possible to apply a brake mechanism regardless of a type of motor used in a power cutting machine, to take an effective measure against a kickback, and to allow a worker to recognize a braking state of a brake.

Hereinafter, an embodiment of the present invention will be described with reference to the drawings. The same reference numbers in the different drawings indicate the same functional parts, and therefore repeated description for each of the drawings is omitted.

A power cutting machine 1 includes a main body 2, an arm 3, and a working device 4. The main body 2 includes a motor 10 such as an engine and an electric motor. The base end of the arm 3 is connected to the main body 2 and the head end of the arm 3 is connected to the working device 4. The arm 3 includes a belt transmission mechanism 20 configured to transmit drive power of the motor 10. The working device 4 includes a cutting blade 5 connected to the head end of the arm 3 and configured to be rotated by power transmitted via the belt transmission mechanism 20.

An output shaft of the motor 10 provided in the main body 2 is connected to a drive pulley 21 of the belt transmission mechanism 20 via a well-known clutch mechanism. The belt transmission mechanism 20 includes the drive pulley 21, a driven pulley 22 provided in the head end of the arm 3, and an endless belt 23 wound around these pulleys. A rotating shaft 5A of the cutting blade 5 is connected to the driven pulley 22 to transmit power of the motor 10 to the cutting blade 5 via the belt transmission mechanism 20.

The main body 2 includes a rear handle 11 and a front handle 12 as handle parts. The rear handle 11 is provided on the rear side of the main body 2, which is close to the operator's body when the operator uses the power cutting machine 1, and an actuating lever 13 of the motor 10 is provided inside the rear handle 11. When the motor 10 is an engine, the actuating lever 13 is a throttle lever. The front handle 12 is provided on the head side of the main body 2 and extends along the direction orthogonal to the longitudinal direction of the arm 3. The working device 4 includes a protecting frame 14. The protecting frame 14 is fixed to the head end of the arm 3 and configured to cover the half circle of the cutting blade 5. This power cutting machine 1 includes a brake mechanism 30 provided on the arm 3.

Figure 2:
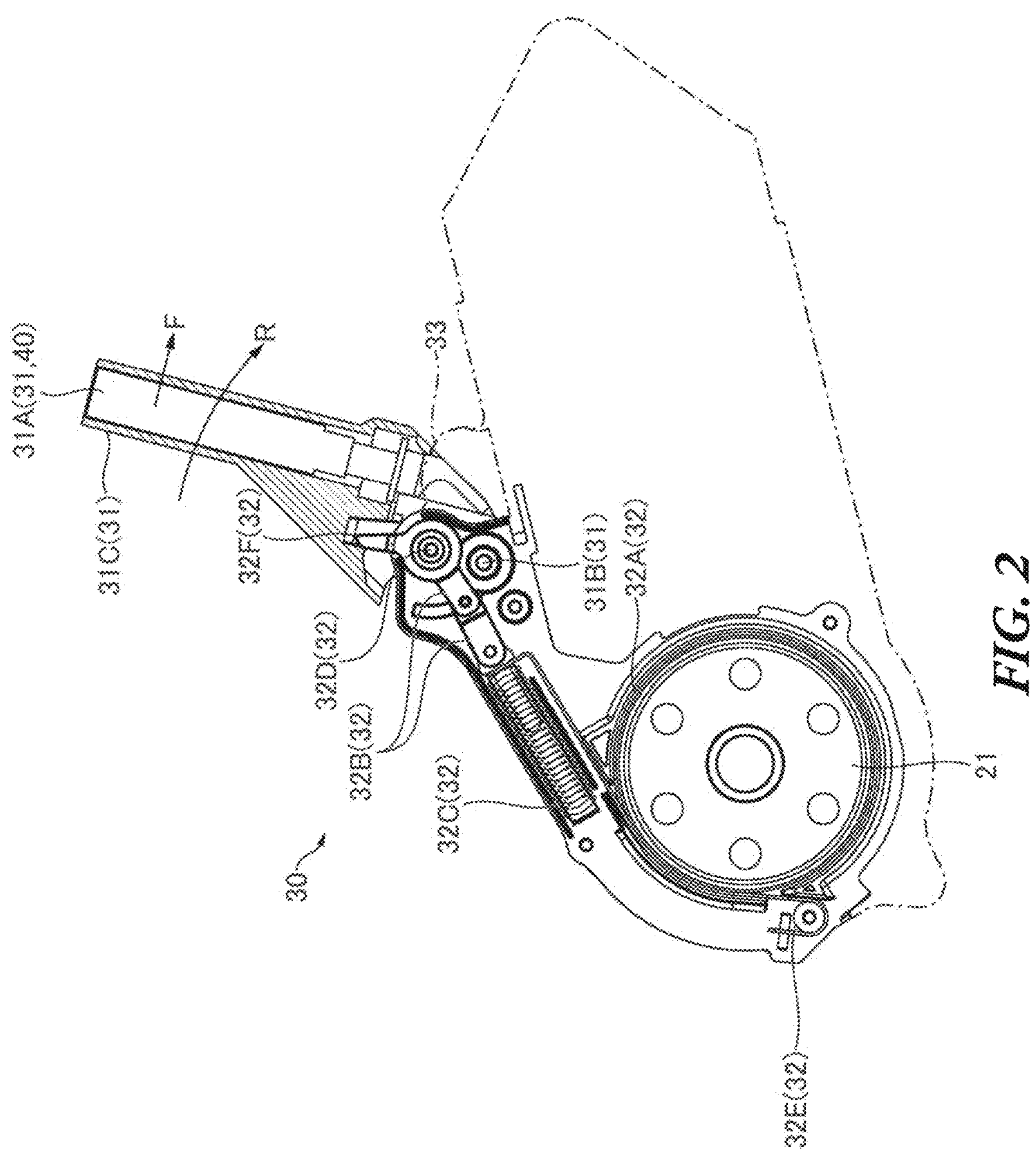
FIG. 2 is an illustration of a brake mechanism.
Figure 3:
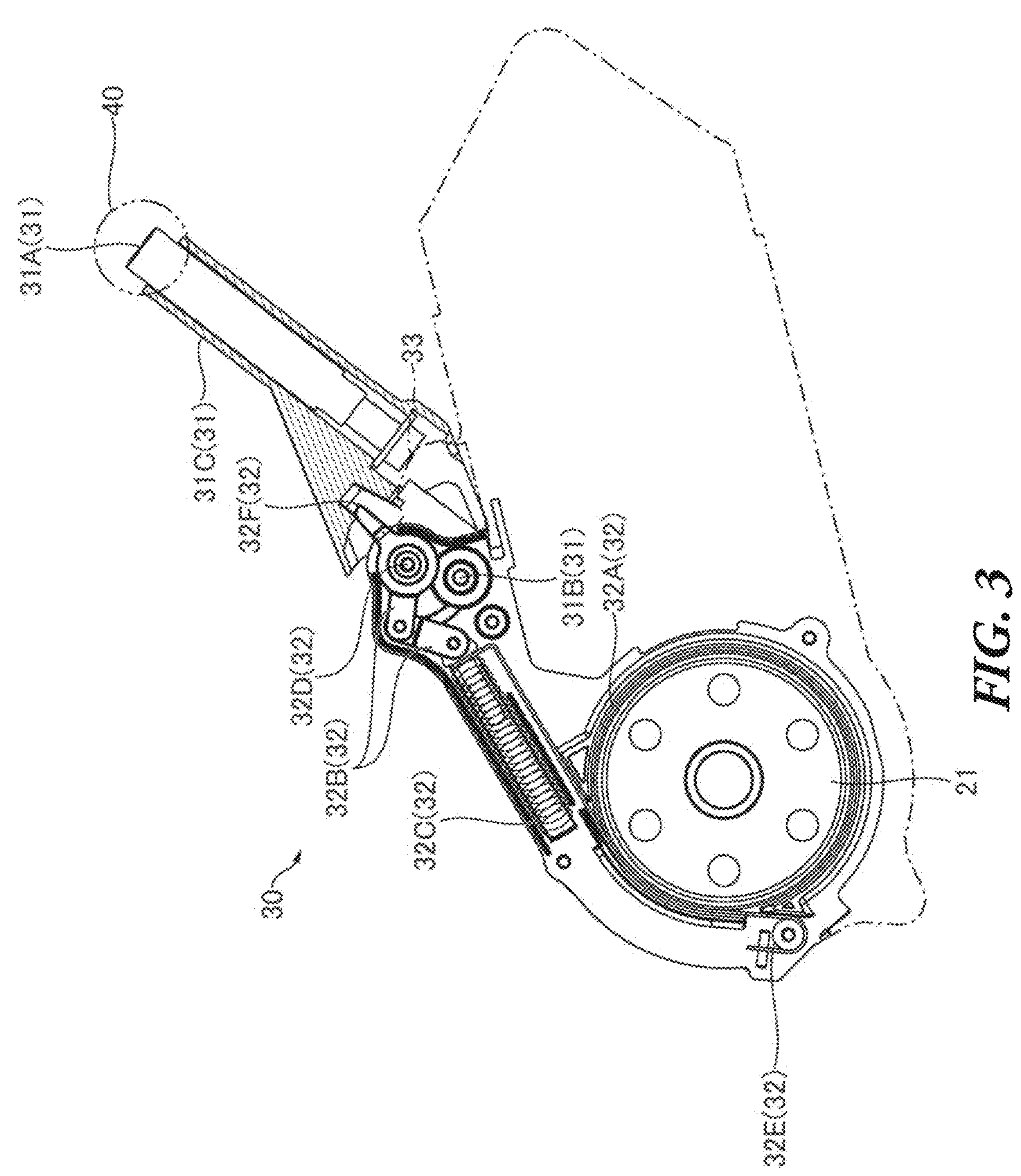
FIG. 3 are illustrations of the brake mechanism and an indicator mechanism.

As illustrated in FIG. 2 and FIG. 3, the brake mechanism 30 includes a detection mechanism 31 configured to detect the movement of the arm 3 along with the bounce of the working device 4 and a tightening mechanism 32 configured to be actuated upon detection of the detection mechanism 31 to tighten a tightening belt 32A wound around the drive pulley 21.

The detection mechanism 31 includes a swing lever 31C configured to pivotally support a mass part 31A around a rotating shaft 31B. FIG. 2 is an illustration of an initial state of the detection mechanism 31. In this state, when the working device 4 bounces up, an inertial force F acts on the mass part 31A to swing the swing lever 31C pivotally supported around the rotating shaft 31B in the direction of arrow R.

Meanwhile, the tightening mechanism 32 includes bending members 32B configured to bend along with the swing of the swing lever 31A and pull one end of the tightening belt 32A. In the initial state of the swing lever 31C illustrated in FIG. 2, the bending members 32B are formed in a straight line, and one end of the bending members 32B is supported by a spring 32C. When the swing lever 31C swings as illustrated in FIG. 3, a lever part 32F engaged with the swing lever 31C rotates around a rotating shaft 32D; one of the bending members 32B pivotally supported around the rotating shaft 32D bends. Then, the linking part of the bending members 32B bends and releases the spring force caused by the compression of the spring 32C which is a strong compression spring, and therefore the tightening belt 32A is instantly tightened.

One end of the tightening belt 32A of the tightening mechanism 32 is connected to the bending members 32B, and the other end is fixed to a fixed shaft 32E in the housing of the arm 3. By this means, the tightening belt 32A naturally tightens the outer circumference of the drive pulley 21 to apply a brake to the drive pulley 21 when the bending members 32B are bent to tighten the tightening belt 32A.

According to the power cutting machine 1 as described above, the detection mechanism 31 detects the movement of the arm 3 when the working device 4 bounces up due to a kickback during cutting work. Then, the brake mechanism 30 is actuated and applies a brake to the drive pulley 21; therefore, the power cutting machine 1 can stop the rotation or reduce the speed of the drive pulley 21 without stopping the motor 10. By this means, the power cutting machine 1 can detect the working device 4 bouncing up due to the kickback via the arm 3 and actuate the brake mechanism 30.

Consequently, it is possible to implement an effective measure against the kickback.

The brake mechanism 30 includes an indicator mechanism 40 configured to allow the braking state to be visually recognized. By the indicator mechanism 40, a worker can visually recognize the movement of the mass part 31A along with the swing of the swing lever 31C. To be more specific, the swing lever 31C is inclined downward when the brake mechanism 30 is in the braking state as illustrated in FIG. 3, and the mass part 31A movably disposed in the swing lever 31C moves; therefore, the tip of the mass part 31A protrudes from the head end of the swing lever 31C. The indicator mechanism 40 can achieve high visibility by using contrasting colors on the outer surface of the swing lever 31C and the mass part 31A protruding from the swing lever 31C.

With this indicator mechanism 40, the worker can see the tip of the mass part 31A protruding from the head end of the swing lever 31C and recognize that the brake mechanism 30 applies a brake to the drive pulley 21. In this case, using contrasting colors on the outer surface of the mass part 31A and the swing lever 31C makes it easy to visually recognize the braking state of the brake mechanism 30.

In the case where a worker restarts the motor 10, the indicator mechanism 40 allows the worker to visually recognize the braking state of the brake mechanism 30 and release it before the restart. With the illustrated example, the swing lever 31C is returned to the state illustrated in FIG. 2, and therefore the braking state of the brake mechanism 30 is released.

With the illustrated example, the mass part 31A is a rod-shaped member incorporated into the swing lever 31C. The base end of the mass part 31A contacts a cam face 33 provided in the arm 3. In the state illustrated in FIG. 2 where the swing lever 31C is not inclined downward, the base end of the mass part 31A is located on a cum recess of the cam face 33. Meanwhile, in the state illustrated in FIG. 3 where the swing lever 31C is inclined downward, the base end of the mass part 31A moves to a cam protrusion of the cam face 33; therefore, the head end of the mass part 31A protrudes from the head end of the swing lever 31C.

In the case where a worker restarts the motor 10, he visually recognizes the mass part 31A protruding and manually operates the swing lever 31C to return to the state illustrated in FIG. 2 to release the braking state of the brake mechanism 30. Meanwhile, the head end of the mass part 31A goes back into the swing lever 31C by returning the swing lever 31C to the original position. Therefore, the indicator mechanism 40 returns to the original state without any special operation, and it does not hamper the operability of the worker.

According to the power cutting machine 1 as described above, it is possible to effectively prevent the kickback of the power cutting machine 1. In addition, the brake mechanism 30 includes the indicator mechanism 40 configured to allow the braking state to be visually recognized; therefore, a worker can visually recognize the braking state of the brake mechanism 30 and avoid operating the actuating lever 13 of the motor 10 when the brake mechanism 30 is in the braking state.

According to the invention having the above-described features, it is possible to effectively prevent a kickback of a power cutting machine. In addition, a brake mechanism includes an indicator mechanism configured to allow a braking state to be visually recognized; therefore, a worker can visually recognize the braking state of the brake mechanism.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A power cutting machine comprising:

a main body including a motor;

an arm connected to the main body at a base end of the arm, and including a belt transmission mechanism configured to transmit drive power of the motor; and a working device connected to the head end of the arm, and including a cutting blade configured to be rotated by the power transmitted via the belt transmission mechanism, wherein:

the arm includes a brake mechanism configured to brake a drive pulley of the belt transmission mechanism;

the brake mechanism includes:

a detection mechanism configured to detect movement of the arm;

a tightening mechanism configured to tighten a tightening belt wound around the drive pulley to bring the drive pulley into a braking state; and an indicator mechanism configured to visually indicate the braking state;

the detection mechanism includes:

a swing lever; and a mass part configured to move within the swing lever; and the indicator mechanism includes:

at least a head end of the mass part, which moves with respect to the swing lever to provide a visual indication of the braking state.

2. The power cutting machine according to claim 1, wherein the tightening mechanism is configured to be actuated upon detection of said movement of the arm by the detection mechanism.

3. The power cutting machine according to claim 1, wherein:

the swing lever is configured to allow the mass part experiencing inertial forces to move with respect to the swing lever when the swing lever swings; and the indicator mechanism allows movement of the mass part with respect to the swing lever to be visually recognized.

4. The power cutting machine according to claim 1, wherein an outer surface of the swing lever and an outer surface of the head end of the mass part have contrasting colors.

5. The power cutting machine according to claim 1, wherein a base end of the mass part contacts a cam face such that the head end of the mass part protrudes from the swing lever due to the swing of the swing lever.

6. The power cutting machine according to claim 1, wherein the main body includes a handle to be held for performing work.

7. The power cutting machine according to claim 1, wherein the drive pulley is connected to an output shaft of the motor with a clutch mechanism interposed therebetween.

8. The power cutting machine according to claim 1, wherein the belt transmission mechanism includes:

a driven pulley provided in a head end of the arm and connected to a rotating shaft of the cutting blade; and an endless belt wound around the drive pulley and the driven pulley.

9. The power cutting machine according to claim 1, wherein the detection mechanism is configured such that when the working device bounces up, an inertial force acts on the mass part to swing the swing lever.

10. The power cutting machine according to claim 1, wherein the swing lever is configured such that a swing of the swing lever tightens the tightening belt.

11. The power cutting machine according to claim 10, wherein:

as the swing lever swings to tighten the tightening belt, the head end of the mass part moves from a position in the swing lever to a protruding position that allows a worker to visually recognize the braking state by recognizing contrasting colors of the mass part and an outer surface of the swing lever when the mass part is in the protruding position, and wherein when the swing lever is manually operated to release the braking state and return to an original position, the mass part moves from the protruding position back into the swing lever.

* * * * *